Oct. 2, 1962    J. R. ANDERSEN    3,056,618
SHAFT KEYING ARRANGEMENT
Filed April 29, 1959
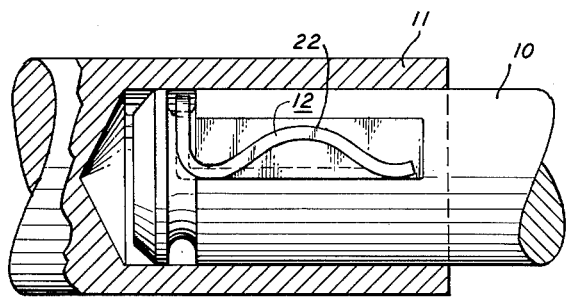
FIG. 1
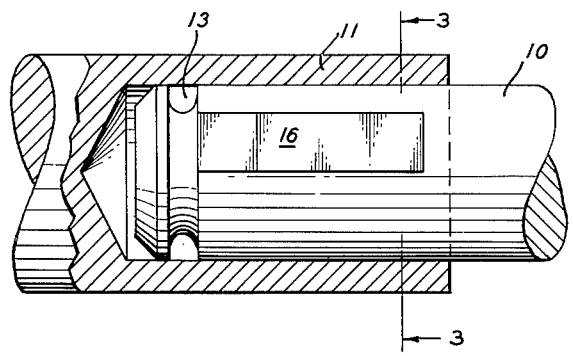
FIG. 2
FIG. 3 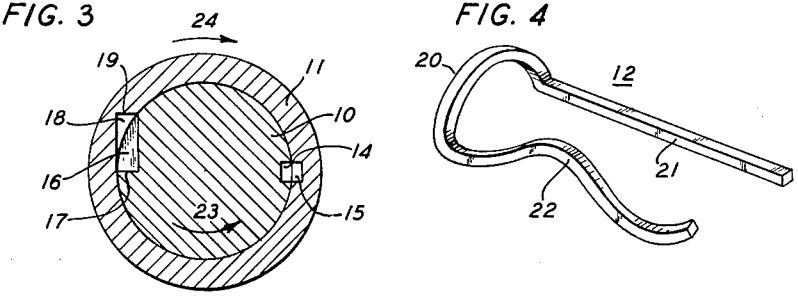 FIG. 4
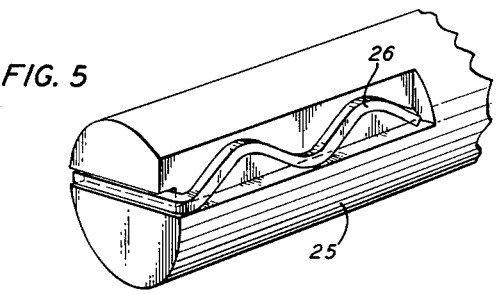
FIG. 5
INVENTOR
J. R. ANDERSEN
BY
Walter M. Hill
ATTORNEY United States Patent Office 3,056,618
Patented Oct. 2, 1962

3,056,618
SHAFT KEYING ARRANGEMENT
Johan R. Andersen, Bloomingdale, N.J., assignor to Bell Telephone Laboratories, Incorporated, New York, N.Y., a corporation of New York
Filed Apr. 29, 1959, Ser. No. 809,875
5 Claims. (Cl. 287—126)

This invention relates to keying arrangements and, in particular, to arrangements for keying a hub to a shaft.

The term "hub" as used in this specification and its claims is meant to include, in addition to the hubs of such devices as pulleys and gears, knobs used on electronic equipment and shafts into which other shafts may be inserted. In other words, the term "hub" is meant to include any device into which a shaft may be inserted and rotated therewith.

Various keying arrangements have been proposed in the past in order to secure a hub to a shaft in a manner whereby backlash or angular play between the hub and the shaft is prevented. The more often used arrangements have employed set screws or accurately machined spline or key arrangements. Although these arrangements have performed their intended function in a satisfactory manner, they have been found to be objectionable at times because of the cost in manufacturing or the time necessary to assemble and disassemble them. Furthermore, it has been found that sometimes set screws become loose and the accurately machined spline and key arrangements develop an undesirable backlash through usage.

It is an object of the present invention to key a hub to a shaft in a manner to prevent backlash without the use of set screws or extremely accurate machined parts.

Another object of the invention is to be able to rapidly assemble and disassemble a hub keyed to a shaft.

In its broadest aspect the present invention comprises a keying arrangement that produces both a tangential force between a hub and a shaft and a limiting action to restrict the relative rotational motion between the hub and the shaft. By this arrangement backlash is prevented when the torque between them is kept within design limits. In one of its embodiments an annular groove and two longitudinal keyways are cut into the shaft with keyways complementary to the shaft keyways cut into the hub. A spring-like keying member is shaped to fit into a portion of the groove with its extremities extending into the openings formed by the keyways. The portion of the member that extends into one of the keyway openings is further shaped so that the spring-like material exerts a tangential force between the hub and the shaft. The portion of the member in the other keyway opening limits the relative motion between the hub and the shaft. The keying member and the two keyway openings thus cooperate to produce an antibacklash keying arrangement.

Other objects and features of the invention will be apparent from a study of the following detailed description of a specific illustrative embodiment.

In the drawings:

FIG. 1 is a fragmentary view of one embodiment of the invention;

FIG. 2 is a fragmentary view of the shaft and hub of the embodiment of FIG. 1;

FIG. 3 is a sectional view of the shaft and hub of FIG. 2;

FIG. 4 is a perspective view of the keying member used in the embodiment of FIG. 1; and FIG. 5 is a perspective view of a shaft and a keying member of another embodiment of the invention.

FIG. 1 is a fragmentary view of one embodiment of the invention in which a shaft 10 is inserted in a hub 11. A keying member 12 is also shown in the view. A better understanding of this embodiment and its operation may be obtained by first considering its various parts as illustrated in FIGS. 2 through 4.

FIG. 2 is a fragmentary view of shaft 10 and hub 11 while FIG. 3 is a cross-sectional view of shaft 10 and 11 taken at section 3—3 of FIG. 2. An annular groove 13 is cut into shaft 10. A keyway 14 which is both rectangular in cross section and substantially parallel to the axis of shaft 10 is cut into shaft 10 so that one of its ends terminates in groove 13. A keyway 15 which is complementary to keyway 14 is cut into hub 11 so as to form a rectangular opening when assembled. Cut into shaft 10 is a second keyway 16 which is also substantially parallel to the axis of shaft 10 and has one of its ends terminating in groove 13. Keyway 16 is V-shaped in cross section with one side 17 lying in a plane passing through the axis of shaft 10. The other side of keyway 16 is perpendicular to side 17. Cut into hub 11 is a keyway 18 which is complementary to keyway 16. Keyways 16 and 18 form a rectangular opening with a side 19 of keyway 18 being opposite and substantially parallel to side 17 of keyway 16.

FIG. 4 is a perspective view of keying member 12 which is made of spring material. Member 12 is shaped so that its centermost portion 20 may be fitted partially around shaft 10 in annular groove 13 with its extremities or legs 21 and 22 extending into the respective openings formed by keyways 14, 15, 16 and 18. Leg 21 is substantially straight while leg 22 is formed so that it exerts a force between surfaces 17 and 19 when it is placed on shaft 10 and shaft 10 is inserted in hub 11 as shown in FIG. 1.

When member 12 is placed on shaft 10 and shaft 10 is inserted in hub 11 as shown in FIG. 1, a force is exerted between surfaces 17 and 19 of keyways 16 and 18, respectively. This force includes a tangential component which tends to cause shaft 10 and hub 11 to move rotationally in directions indicated by arrows 23 and 24 of FIG. 3. Leg 21, however, is in the opening formed by keyways 14 and 15 and therefore restricts the extent of the rotational motion between shaft 10 and hub 11. The force exerted by leg 22 causes shaft 10 and hub 11 to press on opposite sides of leg 21. Backlash between shaft 10 and hub 11 is thereby prevented until the torsional force applied between shaft 10 and hub 11 is sufficient to compress leg 22. In practice, keying member 12 is designed so that the maximum anticipated torque is insufficient to compress leg 22.

The embodiment of FIG. 1 is readily assembled by placing member 12 on shaft 10 and then inserting shaft 10 in hub 11. The assembly is rapidly disassembled by merely pulling shaft 10 from hub 11. Because of the spring-like qualities of extremity 22, keyways 14, 15, 16 and 18 need not be machined to the same degree of accuracy as that required when the elimination of backlash is dependent solely upon the insertion of a straight spline in a keyway. Furthermore, because of the spring-like quality of leg 22, member 12 need not be accurately machined but may be stamped out of sheet stock using conventional machine shop practices.

FIG. 5 is a perspective view of a shaft 25 and a keying member 26 of another embodiment of the invention. Keyways are cut into shaft 25 in a manner identical to those cut into shaft 10 of FIGS. 1, 2 and 3. Shaft 25 also has a slot cut into its end so that the slot terminates in respective ones of the keyways. Member 26 has a general U shape so as to fit into the end slot and keyways. The legs of member 26 are shaped similarly to those of member 12 of FIG. 4. In order to retain member 26 on shaft 25, the metal next to the end slot or the member itself may be expanded or, as it is better known in the art, staked by the use of a center punch or a similar tool.

Shaft 25 and member 26 may be used with hub 11 of the embodiment shown in FIGS. 1, 2 and 3.

Although several embodiments of the invention have been illustrated and described, the invention may take other forms without departing from the spirit and scope of the invention. For example, the shape of the keyways may have other than a rectangular cross section, such as the shape of a parallelogram or a circle and the two legs of the keying member 12 may be disposed at any two spaced points around the periphery of the shaft instead of at substantially diametrically disposed points as specifically illustrated.

What is claimed is:

1. Apparatus for keying a hub to a shaft comprising a first keying member for limiting the relative rotational motion between said hub and said shaft, said first keying member exerting substantially no tangential force between said hub and said shaft, and a second keying member located tangentially of said shaft and engaging both said hub and said shaft for exerting a net tangential force between said hub and said shaft that tends to produce relative rotational motion in only one direction between said hub and said shaft which motion is restricted only by said first keying member for limiting relative rotational motion between said hub and said shaft.

2. In combination, a shaft having two longitudinal keyways cut therein, a hub having a bore for receiving said shaft and two longitudinal keyways cut therein that complement said shaft keyways to form first and second keyway openings when said hub is mounted on said shaft, a keying member in a first one of said keyway openings for limiting the relative rotational motion between said hub and said shaft, said keying member exerting substantially no tangential force between said hub and said shaft, and a resilient keying member located tangentially of said shaft in the other of said keyway openings and engaging both said hub and said shaft for exerting a net tangential force between said shaft and said hub that tends to produce relative rotational motion in only one direction between said shaft and said hub which motion is restricted only by said keying member for limiting relative rotational motion between said hub and said shaft.

3. Apparatus in accordance with claim 2 wherein said second keyway opening is substantially rectangular in cross section with one side lying in a plane passing through the axis of said shaft.

4. In combination, a shaft having an annular groove and two longitudinal keyways cut therein, a hub having a bore for receiving said shaft and two longitudinal keyways cut therein that complement said shaft keyways to form first and second keyway openings when said hub is mounted on said shaft, said second keyway opening having a rectangular cross section with one side lying in a plane passing through the axis of said shaft, and a keying member fitted into a portion of said groove and said keyway openings with the portion of said member in only said second keyway opening having an undulated shape in a direction lying in a plane tangent to said shaft and engaging both said hub and said shaft to tend to produce relative rotational motion between said hub and said shaft which motion is restricted only by the portion of said member in said first keyway opening.

5. In combination, a shaft having an end slot and two longitudinal keyways cut therein, a hub having a bore for receiving said shaft and two longitudinal keyways cut therein that complement said shaft keyways to form first and second keyway openings when said hub is mounted on said shaft, said second keyway opening having a rectangular cross section with one side lying in a plane passing through the axis of said shaft, and a keying member fitted into said end slot and said keyway openings with the portion of said member in only said second keyway opening having an undulated shape in a direction lying in a plane tangent to said shaft and engaging both said hub and said shaft to tend to produce relative rotational motion between said hub and said shaft which motion is restricted only by the portion of said member in said first keyway opening.

References Cited in the file of this patent

UNITED STATES PATENTS

| | | |
|---|---|---|
| 834,579 | Kideney | Oct. 30, 1906 |
| 1,439,769 | Smith | Dec. 26, 1922 |
| 1,565,609 | Webster | Dec. 15, 1925 |
| 1,815,165 | Scofield | July 21, 1931 |
| 2,180,929 | Murphy | Nov. 21, 1939 |
| 2,215,248 | Murphy | Sept. 7, 1940 |

FOREIGN PATENTS

| | | |
|---|---|---|
| 72,912 | Norway | Jan. 28, 1947 |